United States Patent [19]
Garrett et al.

[11] Patent Number: 5,608,307
[45] Date of Patent: Mar. 4, 1997

[54] APPARATUS FOR CONTROLLING EXCESS RECHARGE CURRENT APPLIED TO A BATTERY

[75] Inventors: Scott M. Garrett; Venus D. Desai, both of Lawrenceville; Vernon Meadows, Lilburn; Jose M. Fernandez, Lawrenceville, all of Ga.

[73] Assignee: Motorola, Inc., Schaumburg, Ill.

[21] Appl. No.: 368,267

[22] Filed: Dec. 29, 1994

[51] Int. Cl.⁶ .................................................. H02J 7/16
[52] U.S. Cl. ............................................................ 320/39
[58] Field of Search .................................. 320/5, 12, 13, 320/29, 30, 39, 49, 51, 27

[56] References Cited

U.S. PATENT DOCUMENTS 3,447,059  5/1969  Ford et al. ............................. 320/39 X
3,769,567  10/1973  Cox .......................................... 320/39 X

*Primary Examiner*—Edward H. Tso
*Attorney, Agent, or Firm*—Kenneth M. Massaroni; Scott M. Garrett

[57] ABSTRACT

A battery recharge current source 12 provides a recharge current 14 to battery cells 16. Recharge current 14 is in excess of an optimum recharge current level for battery cells 16 and is divided into currents 26 and 28 by variable shunt load 24 as controlled by charge current control circuit 18. Charge current control circuit 18 is comprised of current sense circuit 20 and load control circuit 22. Current sense circuit 20 produces a current sense signal in response to current through battery cells 16. Load control circuit 22 is responsive to the current sense signal and controls variable shunt load 24 as needed to conduct excess current away from the battery cells.

20 Claims, 2 Drawing Sheets

APPARATUS FOR CONTROLLING EXCESS RECHARGE CURRENT APPLIED TO A BATTERY

TECHNICAL FIELD

This invention relates in general to rechargeable battery systems, and more particularly to rechargeable batteries to which an excess recharge current level may be applied.

BACKGROUND

Present electronics technology has allowed an increased number of sophisticated devices to be made portable. Accordingly, there is an increased demand for power systems for such portable electronics. Typically such power sources come in the form of electrochemical battery systems which may be disposable or rechargeable. From an economic standpoint, rechargeable systems offer an advantage over non-rechargeable systems since such batteries may be used and recharged hundreds of times. This fact has been reflected in the marketplace since virtually all advanced electronic devices come with rechargeable battery systems when purchased.

Some of the more common rechargeable systems include nickel-cadmium (NICD), nickel metal-hydride (NIMH), and sealed lead acid (SLA). Recently, however, other systems have appeared that are promising as well; these include lithium ion (LiION) and lithium solid state/polymer (LiSS). All of these systems are ideally recharged by applying a recharge current that, at least for a portion of the recharge cycle, is held at a constant level. The ideal level is determined by the chemistry involved, as well as the capacity of the battery cells. To illustrate this point, compare NICD and LiSS. NICD technology is very mature, and consequently, robust. NICD cells can handle a significant variation in recharge current levels with minimal effect on the useful life of the cells. As a result, chargers for NICD systems may offer only one recharge current for a variety of capacities. Small NICD batteries are then recharged very rapidly and large capacity NICD batteries take proportionally longer to recharge. LiSS in contrast, is very sensitive to recharge current level. Excess recharge current has a definite negative effect on cell cycle life. However, the increased capacity vs. weight of LiSS makes it a very desirable system for very small portable devices such as cellular phones.

The disadvantage of rechargeable battery systems is that they do require a substantial investment by the consumer compared to the disposable non-rechargeable systems. Accordingly, it is desirable from a marketing standpoint to offer new rechargeable systems in a retro-fit fashion. That is, the newer power source can take advantage of the chargers of the older systems. In this way consumers can enjoy the benefit of the latest battery chemistry systems without necessarily having to purchase a new charger. In order to do this, the recharge current must be controlled such that the cells of a newer battery system receive an optimum recharge current. Any current in excess of this optimum level provided by the charger must be diverted away from the cells in order to prolong the useful cycle life of the battery.

Another consideration is the cost of the charger. Since the recharge current is typically regulated to a constant level, the power regulator circuitry is the most expensive part of the charger. If the current were less regulated the charger cost could be reduced considerably. One example of a less regulated system would allow full wave rectified current pulses to be applied to the battery, resulting in very high peak currents. The result would be that a high current in excess of the optimum recharge current level would be applied every cycle, unless a means were devised to divert the excess current away from the battery cells.

Therefore there exists a need for a recharge current control means which diverts current in excess of a predetermined optimum recharge current level away from the battery cells. This recharge current control could also be retro-fit into an existing battery system charger, in an inexpensive manner.

DETAILED DESCRIPTION OF THE PREFERRED EMBODIMENT

Figure 1:
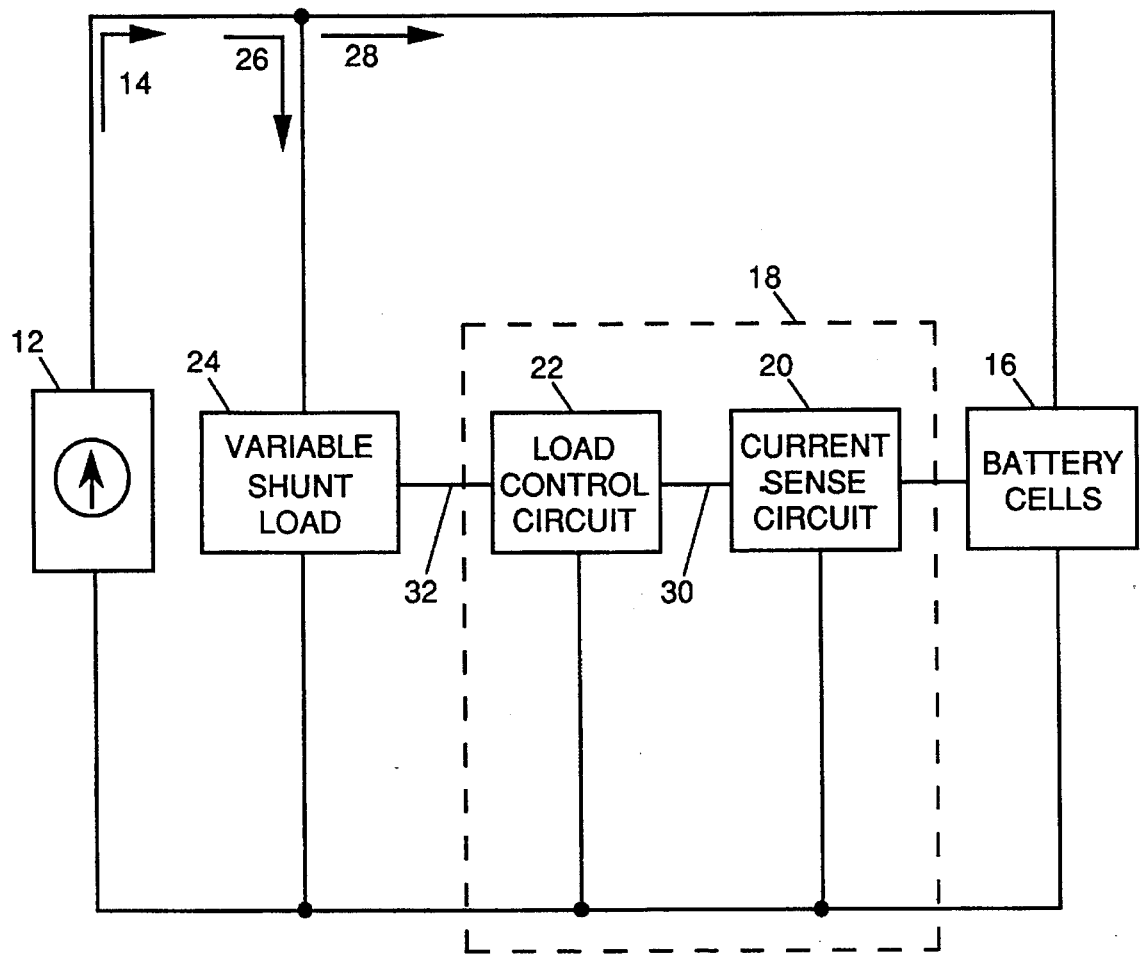
FIG. 1 is a block diagram of a battery charging system in accordance with the invention.

While the specification concludes with claims defining the features of the invention that are regarded as novel, it is believed that the invention will be better understood from a consideration of the following description in conjunction with the drawing figures, in which like reference numerals are carried forward.

Referring now to FIG. 1, where there is illustrated therein a block diagram representation of a battery charging system 10 in accordance with the instant invention. System 10 includes a recharge current source 12 which provides a recharge current in the direction of arrow 14 to at least one battery cell 16. A control circuit 18, comprised of current sense circuit 20 and load control circuit 22, controls variable shunt load 24 to divide the recharge current 14 into current paths 26 and 28. Current 28 is equal to or less than a predetermined optimum recharge current level for battery cells 16. Current 26 is any current in excess of current 28 provided by recharge current source 12.

Control circuit 18 works as follows: current sense circuit 20 senses the current through battery cells 16 and produces a current sense signal which is output to load control circuit 22 via line 30. Load control circuit 22 is responsive to the current sense signal and produces a load control signal for controlling variable shunt load 24, via line 32. As a result, variable shunt load 24 changes resistance such that current 26 is diverted through it, and no more than the preselected optimum recharge current level is applied to battery cells 16. If recharge current 14 is less than, or equal to the optimum recharge current level for battery cells 16, then current 28 will be equal to current 14, and current 26 will be zero as variable shunt load 24 will be controlled to a high resistance state.

Figure 2:
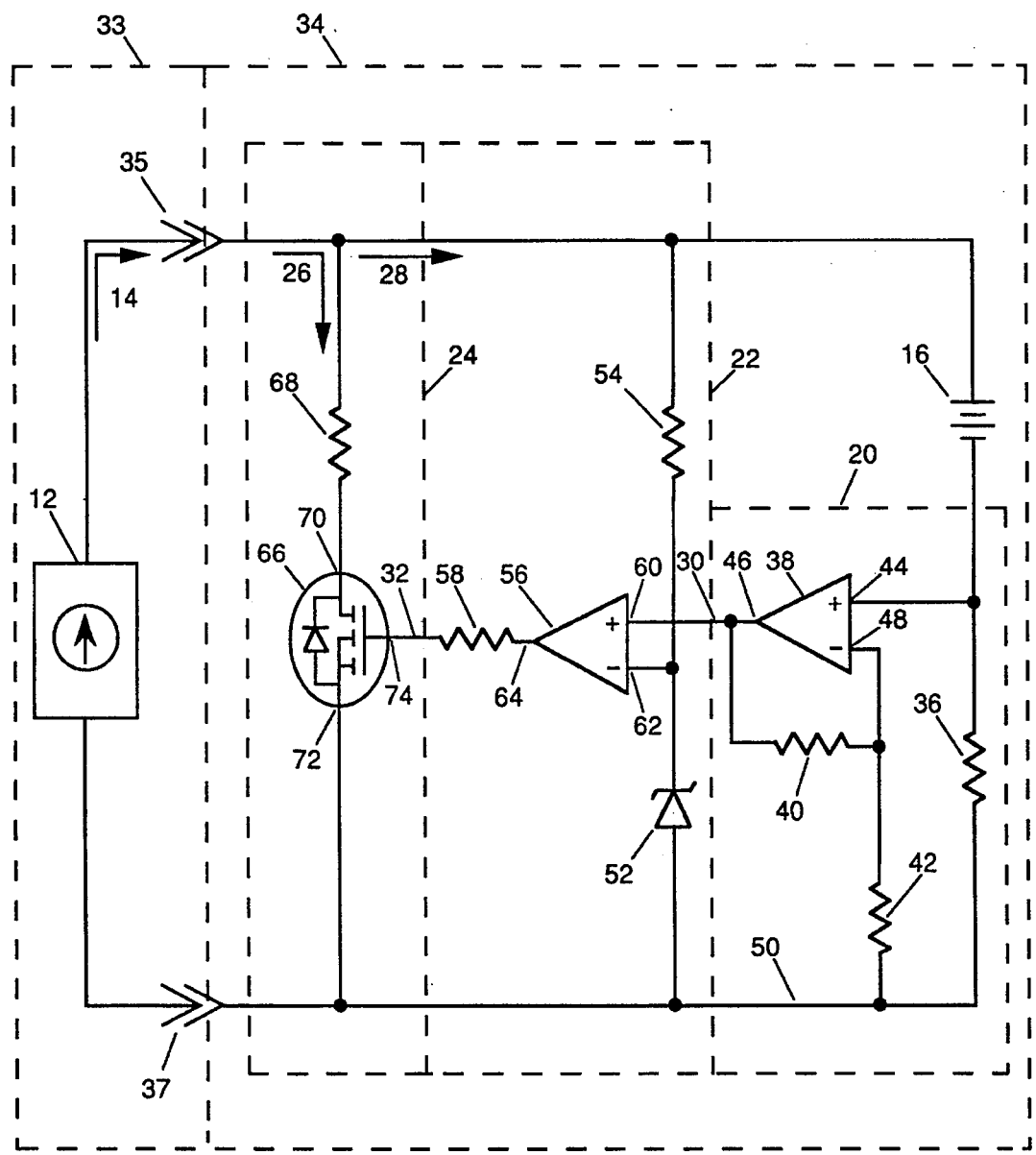
FIG. 2 is a circuit diagram of a current control circuit in accordance with the invention.

Referring now to FIG. 2, where there is illustrated therein a circuit diagram of a current control circuit in accordance with the invention. FIG. 2 illustrates a recharge current source 12 in a charger 33 supplying recharge current 14 to battery pack 34 through positive terminal 35 and negative terminal 37. Battery pack 34 comprises battery cells 16, current sense circuit 20, load control circuit 22, and variable shunt load 24. Recharge current 14 is divided into currents 26 and 28 as previously described.

Current sense circuit 20 comprises sense resistor 36, amplifier 38, first feedback resistor 40, and second feedback resistor 42. Sense resistor 36 is coupled in series with battery cells 16 and a voltage signal is generated that is proportional to current 28 which is fed to the non-inverting input 44 of amplifier 38. The voltage signal is amplified by a preselected gain factor set by first feedback resistor 40, connected between the output 46 and the inverting input 48 of amplifier 38, and second feedback resistor 42 connected between the inverting input 48 and ground reference 50. The gain factor is a predetermined gain factor, and is determined by the ratios of the feedback resistors, in a manner that is well known in the art. As a result, a current sense signal is produced, and reaches a preselected threshold level when current through battery cell 16 reaches the optimum recharge current level.

Load control circuit 22 is comprised of voltage reference 52, bias resistor 54, comparator 56, and output resistor 58. The non-inverting input 60 of comparator 56 is fed the current sense signal from the output 46 of amplifier 38, via line 30. Bias resistor 54 and voltage reference 52 produce a reference voltage level which is fed to the non-inverting input 62 of comparator 56. Comparator 56 is responsive to the difference of the signal applied to input 60 and reference voltage level at input 62, and produces a signal which is resistively coupled through output resistor 58 to variable shunt load 24, via line 32. This signal is the load control signal.

Variable shunt load 24 divides the recharge current 14 as controlled by load control circuit 22 and comprises a variable resistance element, shown here as pass transistor 66. Variable shunt load 24 may further include fixed value resistor 68 connected in series with pass transistor 66 if additional power dissipation capability is required. First conduction terminal 70 of pass transistor 66 is connected to positive terminal 35, either directly or through fixed value resistor 68 as shown. Second conduction terminal 72 is connected to ground reference 50, and bias terminal 74, which acts as a control input, is coupled to line 32. In a preferred embodiment, pass transistor 66 is an N channel MOSFET, first conduction terminal 70 is the drain, second conduction terminal 72 is the source, and bias terminal 74 is the gate. In an alternative embodiment, pass transistor 66 could be a bipolar transistor where first, second, and bias terminals 70, 72, and 74, respectively, would correspond to the collector, emitter, and base, in that order. The bipolar transistor embodiment may be advantageously employed when variable shunt load 22 is not resident in battery pack 34.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A charge control circuit for controlling recharge current through a battery comprising:
   a control means responsive to recharge current through said battery; and
   a variable shunt load responsive to said control means for conducting excess current away from said battery.

2. A charge control circuit as in claim 1, wherein said control means comprises:
   a current sense means for sensing current through said battery, and providing a current sense signal; and
   a load control means responsive to said current sense signal for controlling said variable shunt load.

3. A charge control circuit as in claim 1, wherein said variable shunt load comprises a variable resistance element responsive to said control means.

4. A charge control circuit as in claim 2, wherein said current sense means comprises:
   a sense resistance coupled in series with said battery, thereby producing a voltage signal proportional to the recharge current through said battery; and
   an amplifier means for amplifying said voltage signal by a preselected gain factor, and thereby producing said current sense signal.

5. A charge control circuit as in claim 2, wherein said load control means comprises:
   means for producing a reference voltage level; and
   an amplifier means responsive to the difference of said current sense signal and said reference voltage level for producing a control signal for controlling said variable shunt load.

6. A charge control circuit as in claim 1, wherein said control circuit is resident in a battery pack.

7. A charge control circuit for controlling the recharge current through a battery, comprising:
   a current sense means responsive to said recharge current;
   a variable shunt load electrically connected to said battery; and
   a load control means responsive to said current sense means for controlling said variable shunt load to conduct excess recharge current away from said battery.

8. A charge control circuit as defined in claim 7, wherein said current sense means comprises:
   a sense resistor connected in series with said battery, thereby producing a voltage signal proportional to said recharge current through said battery; and
   means for amplifying said voltage drop by a preselected gain factor.

9. A charge control circuit as defined in claim 7, wherein said variable shunt load comprises a pass transistor responsive to said load control means.

10. A charge control circuit as defined in claim 9, wherein said variable shunt load further comprises a resistor coupled in series with said pass transistor.

11. A battery pack having a charge control circuit for controlling recharge current through said battery pack, comprising:
    at least one battery cell;
    a current sense means responsive to said recharge current, said current sense means comprising a sense resistor connected in series with said at least one battery cell, thereby producing a voltage signal proportional to current through said at least one battery cell, and means for amplifying said voltage drop by a preselected gain factor;
    a variable shunt load electrically connected parallel to said at least one battery cell; and
    a load control means responsive to said current sense means for controlling said variable shunt load to conduct excess recharge current away from said at least one battery cell.

12. A battery pack as defined in claim 11, wherein said variable shunt load comprises a pass transistor responsive to said load control means.

13. A battery pack as defined in claim 12, wherein said variable shunt load further comprises a fixed value resistor coupled in series with said pass transistor.

14. A battery pack as defined in claim 11 wherein said at least one battery cell is selected from the group consisting of lithium ion cells, lithium polymer cells, and sealed lead acid cells, and combinations thereof.

15. A rechargeable battery pack for use with a charger which provides a charge current level in excess of an optimum recharge current level, said battery pack having positive and negative terminals, said battery pack comprising:

at least one battery cell;

a current sense circuit coupled in series with said at least one battery cell for sensing current through said at least one battery cell and producing a current sense signal;

a variable shunt load having a control input, and connected in parallel with said at least one battery cell and said current sense circuit; and a load control circuit coupled between said current sense circuit and said variable shunt load, for producing a load control signal in response to said current sense signal.

16. A rechargeable battery pack as in claim 15, wherein said current sense circuit comprises:

a sense resistor electrically coupled in series with said at least one battery cell, producing a voltage drop proportional to current through said at least one battery cell; and an amplifier for amplifying said voltage drop by a preselected gain factor to produce said current sense signal, said current sense signal reaching a preselected threshold level when current through said at least one battery cell reaches said optimum recharge current level.

17. A rechargeable battery pack as in claim 15, wherein said variable shunt load comprises:

a pass transistor having first and second conduction terminals and a bias terminal, said second conduction terminal connected to said negative terminal of said battery pack, said bias terminal being said control input of said variable shunt load; and a fixed value resistor connected between said first conduction terminal of said pass transistor and said positive terminal of said battery pack.

18. A rechargeable battery pack as in claim 17 wherein said pass transistor is a MOSFET.

19. A rechargeable battery pack as in claim 17 wherein said pass transistor is a bipolar transistor.

20. A rechargeable battery pack as in claim 15, wherein said load control circuit comprises;

a voltage reference for producing a reference voltage level; and a comparator having an inverting input, a non-inverting input, and an output, said inverting input connected to said voltage reference, said non-inverting input connected to said current sense signal, said output resistively connected to said variable shunt load.

* * * * *